United States Patent
Konda et al.

(10) Patent No.: US 9,377,966 B2
(45) Date of Patent: Jun. 28, 2016

(54) METHOD AND APPARATUS FOR EFFICIENTLY PROCESSING STORAGE COMMANDS

(71) Applicant: SAMSUNG ELECTRONICS CO., LTD., Suwon-Si, Gyeonggi-Do (KR)

(72) Inventors: Sreenath Reddy Konda, Bangalore (IN); Rajesh Krishnan, Bangalore (IN); Tirumala Surya Prasad Annepu, Karnataka (IN)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 36 days.

(21) Appl. No.: 14/510,204

(22) Filed: Oct. 9, 2014

(65) Prior Publication Data

US 2015/0100745 A1    Apr. 9, 2015

(30) Foreign Application Priority Data

Oct. 9, 2013   (IN) .......................... 4588/CHE/2013
May 26, 2014   (KR) ........................ 10-2014-0063084

(51) Int. Cl.
   *G06F 3/06*   (2006.01)
(52) U.S. Cl.
   CPC ............ *G06F 3/0659* (2013.01); *G06F 3/0604* (2013.01); *G06F 3/0673* (2013.01)

(58) Field of Classification Search
   None
   See application file for complete search history.

(56) References Cited

U.S. PATENT DOCUMENTS

| | | |
|---|---|---|
| 6,691,204 B1 | 2/2004 | Roohparvar |
| 7,765,367 B2 | 7/2010 | Sung et al. |
| 7,822,949 B2 | 10/2010 | Ogura |
| 8,214,616 B2 | 7/2012 | Ware et al. |
| 8,327,066 B2 | 12/2012 | Heo et al. |
| 2007/0088903 A1 | 4/2007 | Choi |
| 2010/0332718 A1 | 12/2010 | Farrell et al. |
| 2011/0208901 A1 | 8/2011 | Kim et al. |
| 2012/0179866 A1 | 7/2012 | Davis et al. |

FOREIGN PATENT DOCUMENTS

JP       2007-213185       8/2007

*Primary Examiner* — Kevin Verbrugge
(74) *Attorney, Agent, or Firm* — F. Chau & Associates, LLC

(57) ABSTRACT

A method of processing a storage command includes receiving the storage command from a host device at a storage device, processing the storage command, repeatedly, at a pre-determined time interval based on rate information indicating a rate of repetition of the storage command, and sending a response message to the host device, by the storage device, each time the storage command is processed. The storage command includes the rate information.

20 Claims, 11 Drawing Sheets

| 0 TRANSACTION TYPE | | 1 FLAGS | | 2 LUN | | 3 TASK TAG | |
|---|---|---|---|---|---|---|---|
| 4 TI 402 | COMMAND SET TYPE | 5 QUERY FUNCTION/TASK MANAG. FUNCTION | | 6 RESPONSE | | 7 STATUS | |
| 8 TOTAL EHS LENGTH | | 9 DEVICE INFORMATION | | 10 DATA SEGMENT | | 11 LENGTH | |
| 12 | | 13 | | 14 | | 15 | |
| 16 | | 17 | | 18 | | 19 | |
| 20 | | 21 | TRANSACTION SPECIFIC FIELDS | | | 23 | |
| 24 | | 25 | | | | 27 | |
| 28 | | 29 | | 30 | | 31 | |
| K | | K+1 | | K+2 | | K+3 | |
| EXTRA HEADER SEGMENT (EHS) 1 | | | | | | | |
| ⋮ | | | | | | | |
| J | | J+1 | | J+2 | | J+3 | |
| EXTRA HEADER SEGMENT (EHS) N | | | | | | | |
| RESERVED | | | | TIME 404 | | | |
| FI 406 | | MD 408 | | VALUE 410 | | | |
| HEADER E2ECRC (OMIT IF HD = 0) | | | | | | | |
| DATA | | | | | | | |
| DATA E2ECRC (OMIT IF HD = 0) | | | | | | | |

| 0 TRANSACTION TYPE | 1 FLAGS | 2 LUN | 3 TASK TAG 902 |
|---|---|---|---|
| 4 TI 904 | COMMAND SET TYPE | 5 QUERY FUNCTION/TASK MANAG. FUNCTION | 6 RESPONSE | 7 STATUS |
| 8 TOTAL EHS LENGTH | 9 DEVICE INFORMATION | 10 DATA SEGMENT | 11 LENGTH |
| 12 | 13 | 14 | 15 |
| 16 | 17 | 18 | 19 |
| 20 | 21 | TRANSACTION SPECIFIC FIELDS | 23 |
| 24 | 25 | | 27 |
| 28 | 29 | 30 | 31 |
| K | K+1 | K+2 | K+3 |
| EXTRA HEADER SEGMENT (EHS) 1 ||||
| ⋮ ||||
| J | J+1 | J+2 | J+3 |
| EXTRA HEADER SEGMENT (EHS) N ||||
| RESERVED || RESERVED ||
| HEADER E2ECRC (OMIT IF HD = 0) ||||
| DATA ||||
| DATA E2ECRC (OMIT IF HD = 0) ||||

FIG. 10

| 0 TRANSACTION TYPE | 1 FLAGS | 2 LUN | 3 TASK TAG |
|---|---|---|---|
| 4 T: 1002 / COMMAND SET TYPE | 5 RESERVED | 6 TIME INFO PACKET 1004 | 7 STATUS |
| 8 TOTAL EHS LENGTH | 9 RESERVED | 10 RESERVED | 11 RESERVED |
| 12 | 13 RESERVED | 14 | 15 |
| 26 | 29 RESERVED | 30 | 31 |
| 26 | 29 RESERVED | 30 | 31 |
| 26 | 29 RESERVED | 30 | 31 |
| 28 RESERVED | 29 RESERVED | 30 | 31 TIME 1006 |
| HEADER E2ECRC (OMIT IF HD = 0) | | | |
| K SENSE DATA LENGH | K+1 | K+2 SENSE DATA[0] | K+3 SENSE DATA[1] |
| ⋮ | | | |
| J SENSE DATA[14] | J+1 SENSE DATA[15] | J+2 SENSE DATA[16] | J+3 SENSE DATA[17] |
| DATA E2ECRC (OMIT IF HD = 0) | | | |

METHOD AND APPARATUS FOR EFFICIENTLY PROCESSING STORAGE COMMANDS

CROSS-REFERENCE TO RELATED APPLICATIONS

This application claims priority under 35 U.S.C. §119 to Indian Patent Application No. 4588/CHE/2013, filed on Oct. 9, 2013, and Korean Patent Application No. 10-2014-0063084, filed on May 26, 2014, the disclosures of which are incorporated by reference herein in their entirety.

TECHNICAL FIELD

Exemplary embodiments of the present inventive concept relate to storage devices, and more particularly, to efficiently processing storage commands.

DISCUSSION OF THE RELATED ART

Many transactions occurring between a host device and a storage device are deterministic in nature. For example, a media player may read data from a memory card at a constant rate, a network upload or download operation may occur at a constant rate depending on the network and interface capabilities, a file copy operation may occur at a constant rate based on the involved interface, host, and device capabilities, etc.

SUMMARY

Exemplary embodiments of the present inventive concept provide a method, apparatus, and system for efficiently processing storage commands.

According to an exemplary embodiment of the present inventive concept, a method of processing a storage command includes receiving the storage command from a host device at a storage device, processing the storage command, repeatedly, at a pre-determined time interval based on rate information indicating a rate of repetition of the storage command, and sending a response message to the host device, by the storage device, each time the storage command is processed. The storage command includes the rate information.

According to an exemplary embodiment of the present inventive concept, a storage device includes a processor, a memory, and a command processing module. The command processing module is configured to receive a storage command from a host device, process the storage command, repeatedly, at a pre-determined time interval based on rate information indicating a rate of repetition of the storage command, and send a response message to the host device each time the storage command is processed. The storage command includes the rate information.

According to an exemplary embodiment of the present inventive concept, a system includes a host device and a storage device coupled to the host device. The host device is configured to generate a storage command including rate information indicating a rate of repetition of the storage command. The storage device is configured to process the storage command, repeatedly, at a pre-determined time interval based on the rate information, and send a response message to the host device each time the storage command is processed.

According to an exemplary embodiment of the present inventive concept, a method of processing a storage command includes determining, at a host device, a rate of repetition of the storage command, computing, at the host device, a number of times the storage command is to be executed, sending the storage command from the host device to the storage device, wherein the storage command includes the rate of repetition of the storage command and the number of times the storage command is to be executed, extracting, at the storage device, the rate of repetition of the storage command and the number of times the storage command is to be executed, processing the storage command repeatedly, at the storage device, based on the rate of repetition of the storage command and the number of times the storage command is to be executed, and sending a response from the storage device to the host device each time the storage command is processed.

BRIEF DESCRIPTION OF THE DRAWINGS

The above and other features of the present inventive concept will become more apparent by describing in detail exemplary embodiments thereof with the accompanying drawings, in which.

DETAILED DESCRIPTION OF THE EXEMPLARY EMBODIMENTS

Exemplary embodiments of the present inventive concept will be described more fully hereinafter with reference to the accompanying drawings. Like reference numerals may refer to like elements throughout the accompanying drawings.

It will be understood that when an element is referred to as being "on", "connected to" or "coupled to" another element, it can be directly on, connected or coupled to the other element or intervening elements may be present.

It will be understood that, although the terms first, second, etc. may be used herein to describe various elements, these elements should not be limited by these terms. These terms are only used to distinguish one element from another. Thus, a first element could be termed a second element without departing from the teachings of the present inventive concept.

Exemplary embodiments of the present inventive concept provide a method and system for efficiently processing storage commands.

Herein, the terms "storage command", "command", and "read/write command" may be used interchangeably.

Figure 1:
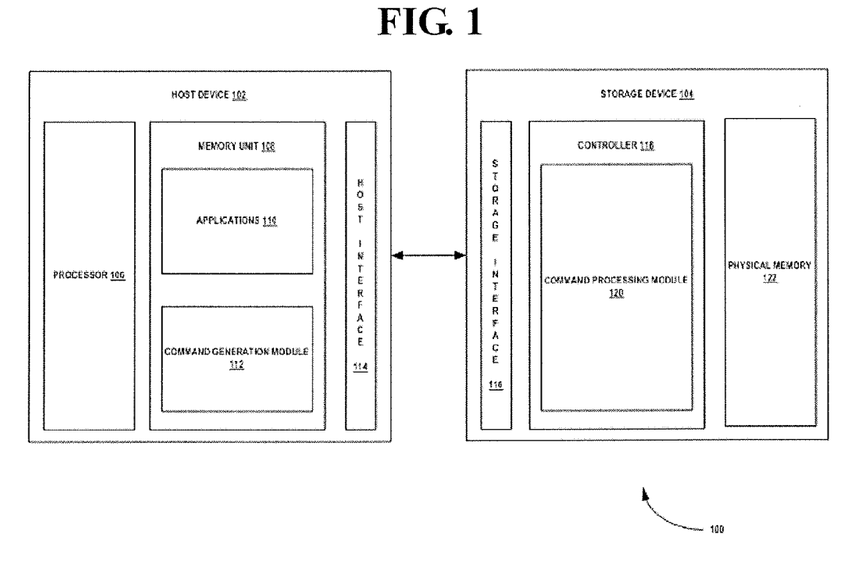
FIG. 1 is a block diagram of a storage system capable of efficiently processing storage commands, according to an exemplary embodiment of the present inventive concept.

FIG. 1 is a block diagram of a storage system 100 capable of efficiently processing storage commands, according to an exemplary embodiment. In FIG. 1, the system 100 includes a host device 102 and a storage device 104. The host device 102 may be, for example, a personal computer (PC), a smartphone, a mobile phone, a digital camera, a video recorder, a tablet computer, a personal digital assistant (PDA), etc. The storage device 104 may be, for example, a Universal Flash Storage (UFS) device, a Solid State Drive (SSD) device (e.g., an SSD card), a memory card, a Universal Serial Bus (USB) flash drive, etc. The host device 102 includes, for example, a processor 106, a memory unit 108 and a host interface 114. The memory unit 108 includes, for example, a plurality of applications 110 (e.g., a media player application, a word processing application, etc.) and a command generation module 112. The storage device 104 includes, for example, a storage interface 116, a controller 118 including, for example, a command processing module 120, and a physical memory 122.

In an exemplary embodiment, the command generation module 112 generates a command for reading/writing data from/to the storage device 104. The command generated by the command generation module 112 may include indicative data indicating, for example, a rate of repetition and a number of times (e.g., a pre-determined number of times) that the command is to be repeatedly processed. Herein, when a command is referred to as being repeatedly processed, it is understood that the command is processed at least two times. The command generation module 112 sends the generated command to the storage device 104 via the host interface 114. The command processing module 120 automatically processes the command after a preset time interval has elapsed, and processes the command a certain number of times as indicated by the indicative data included in the command received from the host device 102. The command processing module 120 sends a response to the host device 102 via the storage interface 116 after processing the command each time. In this case, when the host device does not specify the number of times the command is to be repeatedly processed in the command, the host device 102 sends a request to stop repeated processing of the command when the desired action (e.g., a read action or a write action) is complete. Until then, the command processing module 120 repeatedly processes the command once the preset time interval has elapsed.

In an exemplary embodiment, the repeated processing of the command may be terminated upon processing the command for the pre-determined number of times indicated by the indicative data included in the command. Further, the repeated processing of the command may be terminated in response to receiving a termination request to terminate repetition of the storage command from the host device 102. Further, the indicative data included in the command may indicate a pre-determined duration of time, and the repeated processing of the command may be postponed for the pre-determined duration of time.

In an exemplary embodiment, the command generation module 112 generates a storage command (e.g., a write command) having a preset time period and sends the storage command (e.g., the write command) to the storage device 104 via the host interface 114. The command processing module 120 processes the storage command (e.g., the write command) and sends a round-trip time (RTT) value to the host device 102. The command processing module 120 determines whether a data packet (e.g., a data-out packet) has been received from the host device 102 within the preset time period indicated by the storage command (e.g., the write command) (e.g., prior to the expiration of the preset time period). If the data packet (e.g., the data-out packet) has not been received within the preset time period (e.g., prior to the expiration of the preset time period), the command processing module 120 terminates the data operation (e.g., the write operation) and transitions to a new state (e.g., enters an idle mode). Alternatively, the command processing module 120 may process a new storage command (e.g., a new write command) upon termination of the data operation (e.g., the write operation).

In an exemplary embodiment, the command generation module 112 generates read commands indicating associated time information and sends the read commands to the storage device 104 via the host interface 114. The command processing module 120 may postpone processing of the read commands based on the associated time information. The command processing module 120 processes each of the read commands at a scheduled time and sends responses to the host device 102 via the storage interface 116.

In an exemplary embodiment, the command generation module 112 generates a command with a request for processing time and sends the command to the storage device 104. The command processing module 120 determines the time required to process the command based on the request and sends a response message indicating the time required to process the command to the host device 102 via the storage interface 116. The command generation module 112 determines whether the command has to be processed earlier than the time indicated in the response message and may accordingly modify the priority associated with the command based on this determination. Accordingly, the command generation module 112 may send the modified priority of the command to the storage device 104, and the command processing module 120 may process the command according to the modified priority.

Figure 2:
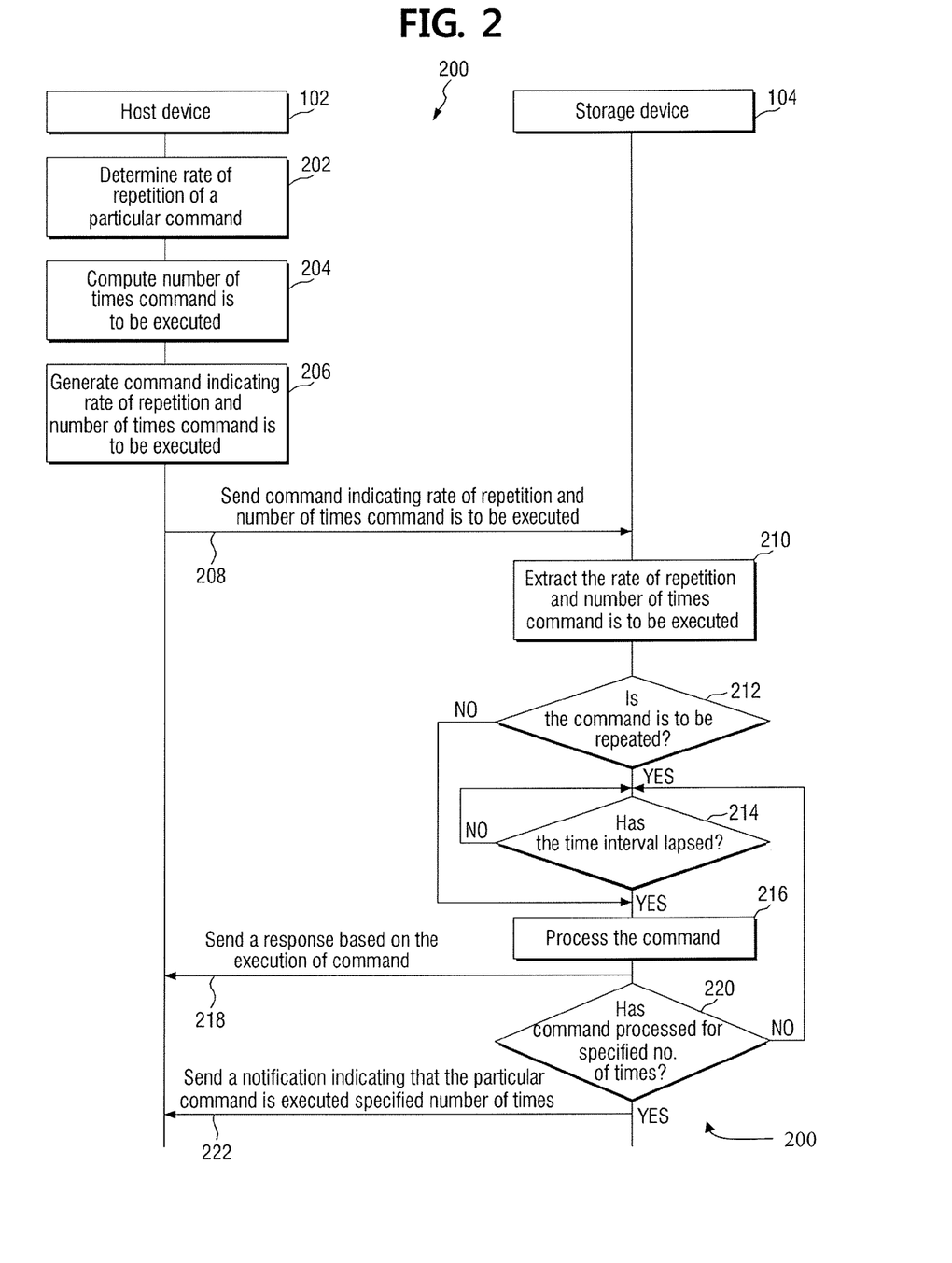
FIG. 2 is a flow diagram illustrating an exemplary method of repeatedly processing storage commands, according to an exemplary embodiment of the present inventive concept.

FIG. 2 is a flow diagram 200 illustrating an exemplary method of repeatedly processing storage commands, according to an exemplary embodiment. At operation 202, the host device 102 determines the rate of repetition of a particular command or set of commands. For example, in a comparative example, if it is desired that the host device 102 check a device live status, the host device may be required to send the same command to the storage device 104 several times at a regular time interval. To avoid this, in exemplary embodiments of the present inventive concept, the host device 102 determines the rate of repetition based on the regular time interval, allowing the storage device 104 to repeat the command by itself at the regular time interval. For example, in an exemplary scenario in which it is desired that the host device 102 repeatedly process a command every 10 milliseconds, the rate of repetition is 10 milliseconds. At operation 204, the host device 102 computes the number of times the command is to be executed by the storage device 104. For example, the host device 102 may have a read request that is larger than one read unit command. In this case, the host device 102 determines the number of times the read unit command is to be executed based on the size of the read request with respect to the size of the read unit command. At operation 206, the host device 102 generates the command. As described above, according to exemplary embodiments, the command includes indicative data indicating the rate of repetition of the command and the number of times the command is to be executed. The command may be, for example, a read Universal Flash Storage Protocol Information Unit (UPIU) or a write UPIU.

At operation 208, the host device 102 sends the command, which indicates the rate of repetition of the command and the number of times the command is to be executed, to the storage device 104. At operation 210, the storage device 104 extracts the rate of repetition and the number of times the command is to be executed from the received command.

At operation 212, the storage device 102 determines whether the command is to be repeatedly processed based on the rate of repetition indicated in the received command. If the command is to be processed a single time (e.g., if the command is not to be repeated), then at operation 216, the storage device 104 processes the received command and sends a response based on the processed command at operation 218.

If the command is to be repeatedly processed, then at operation 214, the storage device 104 determines whether the time interval for processing the command has elapsed. If the time interval has elapsed, then at operation 216, the storage device 104 repeats and processes the command. At operation 218, the storage device 104 sends a response based on the execution of the command. If the time interval has not elapsed, then the storage device 104 repeats operation 214.

At operation 220, the storage device 104 determines whether the received command has been processed for a specified number of times based on the number of times the command is to be executed as indicated by the received command. If the received command has been processed for the specified number of times, at operation 222, the storage device 104 sends a notification indicating that the command has been executed for the specified number of times. If the received command has not been processed the specified number of times, then the storage device 104 repeats operations 214 to 222. By performing the above operations 202 to 222, in exemplary embodiments of the present inventive concept, the host device 102 is not required to send multiple commands for the same purpose when data is requested, and the number of interrupts and the amount of context switching may be reduced.

Figure 3:
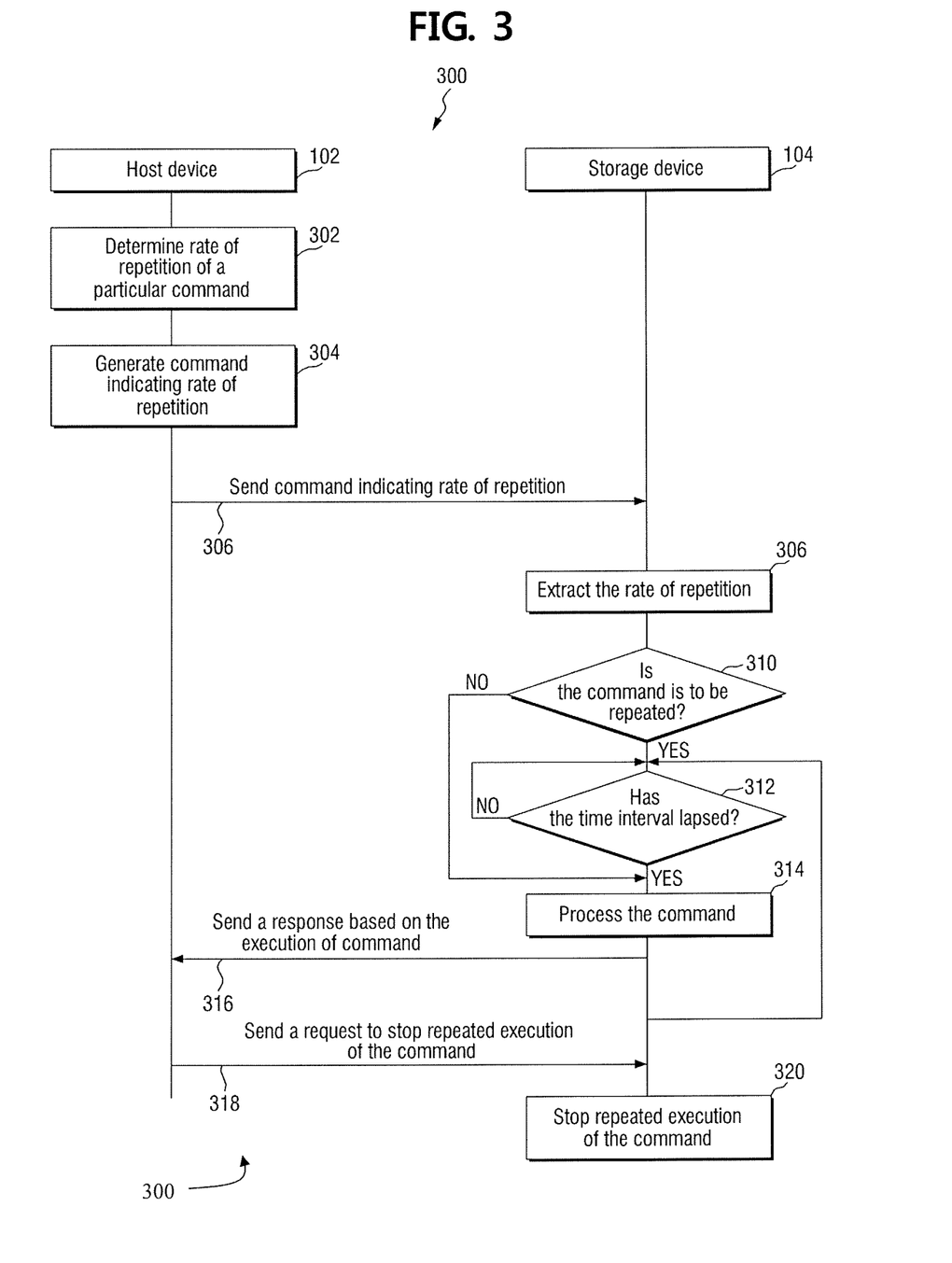
FIG. 3 is a flow diagram illustrating an exemplary method of repeatedly processing storage commands, according to an exemplary embodiment of the present inventive concept.

FIG. 3 is a flow diagram 300 illustrating an exemplary method of repeatedly processing storage commands, according to an exemplary embodiment. At operation 302, the host device 102 determines the rate of repetition of a particular command. At operation 304, the host device 102 generates the command, which includes indicative data indicating the rate of repetition. At operation 306, the host device 102 sends the command indicating the rate of repetition to the storage device 104.

At operation 308, the storage device 104 extracts the rate of repetition from the received command. At operation 310, the storage device 102 determines whether the command is to be repeatedly processed based on the rate of repetition indicated by the received command. If the command is to be processed a single time (e.g., if the command is not to be repeated), then at operation 314, the storage device 104 processes the received command and sends a response based on the processed command at operation 316.

If the command is to be repeatedly processed, then at operation 312, the storage device 104 determines whether the time interval for processing the command has elapsed. If the time interval has elapsed, then at operation 314, the storage device 104 repeats and processes the command. At operation 316, the storage device 104 sends a response based on the execution of the command. In exemplary embodiments, the storage device 104 may modify one or more fields specified by the host device 102 in the response. For example, the host device 102 may indicate that a Logical Block Address (LBA) field (e.g., when LBA is sequential) is to be incremented every time a read command is repeated and executed. Accordingly, the storage device 104 may increment the Logical Block Address (LBA) field in the response and send the response to the host device 102. Thus, in an exemplary embodiment, a logical block address included in, for example, the physical memory 122, may be updated each time the command is processed.

If the time interval has not elapsed at operation 312, then the storage device 104 repeats operation 312. After operation 316, the storage device 104 returns to operation 312 and repeatedly processes the commands based on the rate of repetition until a request to stop execution of the command is received from the host device 102.

Once the storage device 104 has processed the command repeatedly for the desired number of times, at operation 318, the host device 102 sends a request to stop repeated execution of the command. At operation 320, the storage device 104 stops repeated execution of the command based on the request.

Figure 4:
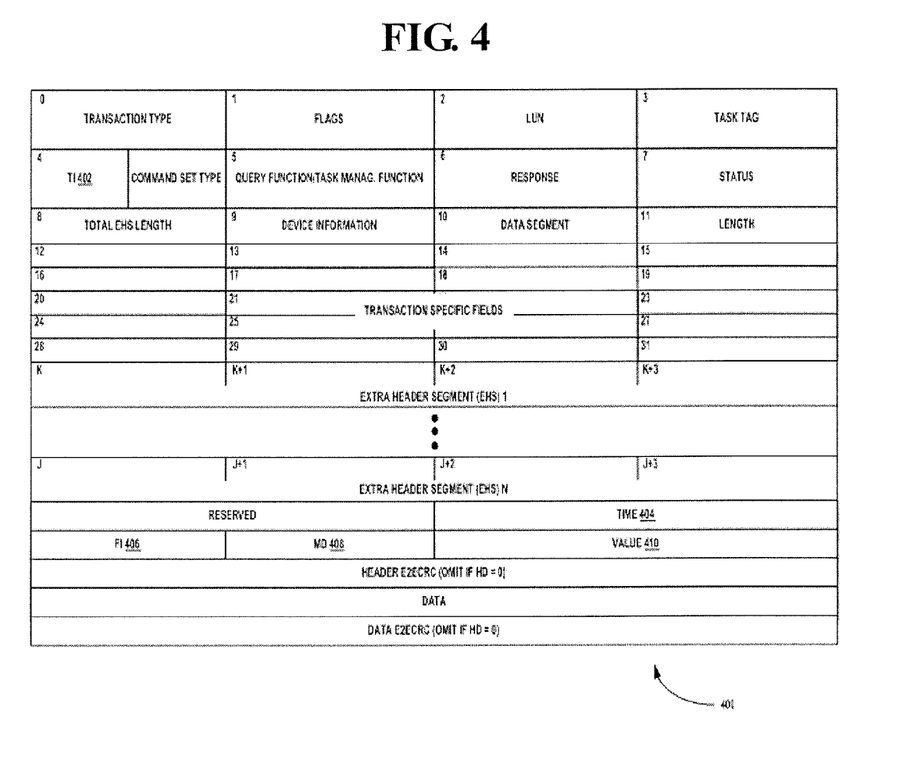
FIG. 4 is a schematic representation illustrating the format of a Universal Flash Storage Protocol Information Unit (UPIU) header, according to an exemplary embodiment of the present inventive concept.

FIG. 4 is a schematic representation illustrating the format 400 of a UPIU header, according to an exemplary embodiment. The UPIU header format 400 may include, for example, a Time/Rate Information (TI) field 402, a time field 404, a field identify (FI) field 406, a Modification Direction (MD) field 408, and a value field 410.

The TI field 402 indicates that a command needs to be repeated at a given time interval. The TI field 402 may have a size of, for example, 4 bits. For example, in an exemplary scenario, the TI field 402 may be set to a value of 'xx00b' if the time field 404 is absent in the UPIU header 400. The TI field 402 may be set to a value of 'xx01b' if the time field 404 indicates the time at which the command has to be executed. The TI field 402 may be set to a value of 'xx10b' if the time field 404 indicates a timeout of the command. The TI field 402 may be set to a value of xx11b' if the time field 404 indicates the time interval between two successive repetitions of the command. In an exemplary scenario, if the TI field 402 is set to a value of 'xx11b', then the host device 102 sends a request to stop the repetition of the command to the storage device 104, as illustrated in FIG. 3.

When the command is to be repeated, the time field 404 indicates the time interval between two successive executions of the command. The FI field 406 identifies a field to be modified by the storage device 104 after each execution of the command. The MD field 408 indicates whether the field identified in the FI field 406 is to be modified (e.g., incremented, decremented, added or subtracted). The value field 410 includes a value by which the field indicated in the FI field 406 is to be modified. In exemplary embodiments, the UPIU header 400 includes the FI field 406, the MD field 408, and the value field 410 if the TI field 402 is set to a value of 'xx11b'. The UPIU header 400 may also include a field to indicate a number of times a particular command is to be repeated. In this case, the host device 102 need not send a request to stop repetition of the command, and the storage device 104 may automatically stop the repetition of the command upon processing the command for the specified number of times, as illustrated in FIG. 2.

Figure 5:
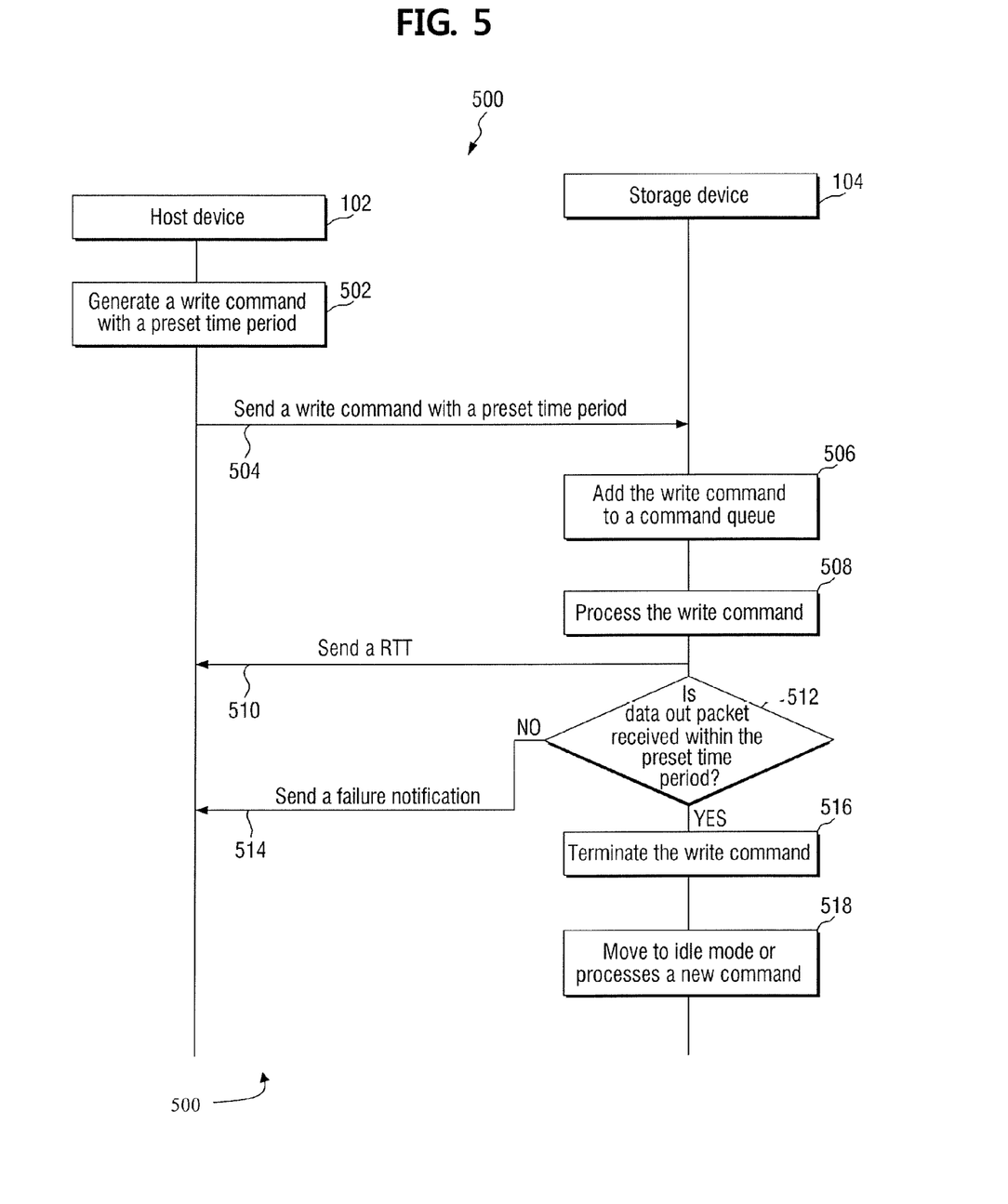
FIG. 5 is flow diagram illustrating an exemplary method of processing of storage commands, according to an exemplary embodiment of the present inventive concept.

FIG. 5 is flow diagram 500 illustrating an exemplary method of processing storage commands, according to an exemplary embodiment. At operation 502, the host device 102 sends a write command with a preset time period (also referred to as a 'wait timeout') for performing a write operation at the storage device 104. The preset time period is a time period for which the storage device 104 can wait for a data packet (e.g., a data-out packet) prior to entering an idle mode or processing another command. At operation 504, the host device 102 sends the write command with the preset time period to the storage device 104. Alternatively, the host device 102 may send a common configuration descriptor with the preset time period to the storage device 104. At operation 506, the storage device 104 adds the write command to a command queue. At operation 508, the storage device 104 processes the write command in the command queue. At operation 510, the storage device 104 sends an RTT value to the host device 102.

At operation 512, the storage device 104 determines whether a data packet (e.g., a data-out packet) has been received within the pre-set time period. If no data packet (e.g., data-out packet) has been received within the preset time period, at operation 514, the storage device 104 sends a failure notification to the host device 102. The failure notification may include, for example, the pre-set time period value and/or the common configuration descriptor value. At operation 516, the storage device 104 terminates the write operation and moves to an idle mode or processes a next write command at operation 518.

Figure 6:
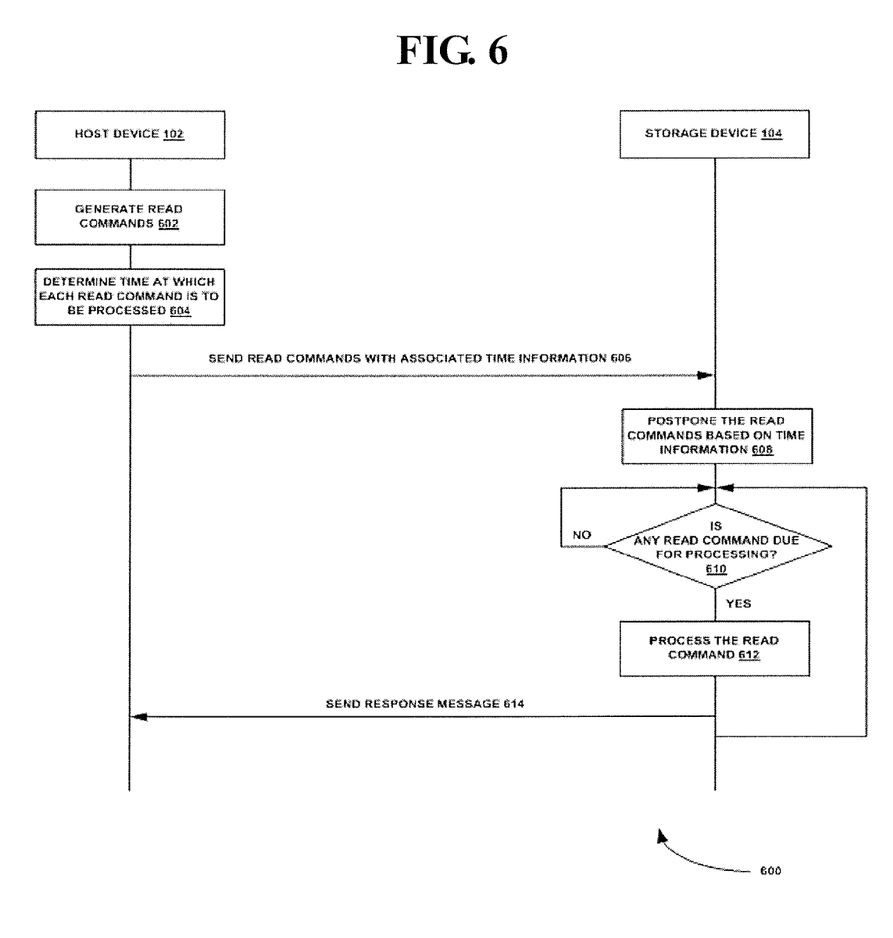
FIG. 6 is a flow diagram illustrating an exemplary method of processing storage commands, according to an exemplary embodiment of the present inventive concept.

FIG. 6 is a flow diagram 600 illustrating an exemplary method of processing storage commands, according to an exemplary embodiment. At operation 602, the host device 102 generates read commands for performing a read operation at the storage device 104. At operation 604, the host device 102 determines a time at which each read command is to be processed. At operation 606, the host device 102 sends the read commands with association time information to the storage device 104.

At operation 608, the storage device 104 postpones the read commands based on the time information. For example, in an exemplary scenario, if a read command 1 is to be executed immediately (e.g., at about 0 seconds), then the storage device 104 executes the read command 1 immediately. If a read command 2 is to be executed after about 30 seconds, then the storage device 104 postpones the execution of the read command 2 by about 30 seconds. At operation 610, the storage device 104 continuously determines whether any postponed read command is due for processing. If the postponed read commands are due for processing, then at operation 612, the storage device 104 processes the postponed read commands that are due for processing. At operation 614, the storage device 104 sends a response message after processing the postponed read command and repeats operations 610 to 614 until no read commands are due for processing. In exemplary embodiments, when there are no read commands to be processed prior to the postponed read commands, the storage device 104 may process the postponed read commands ahead of time and respectively send response messages to the host device 102.

Figure 7:
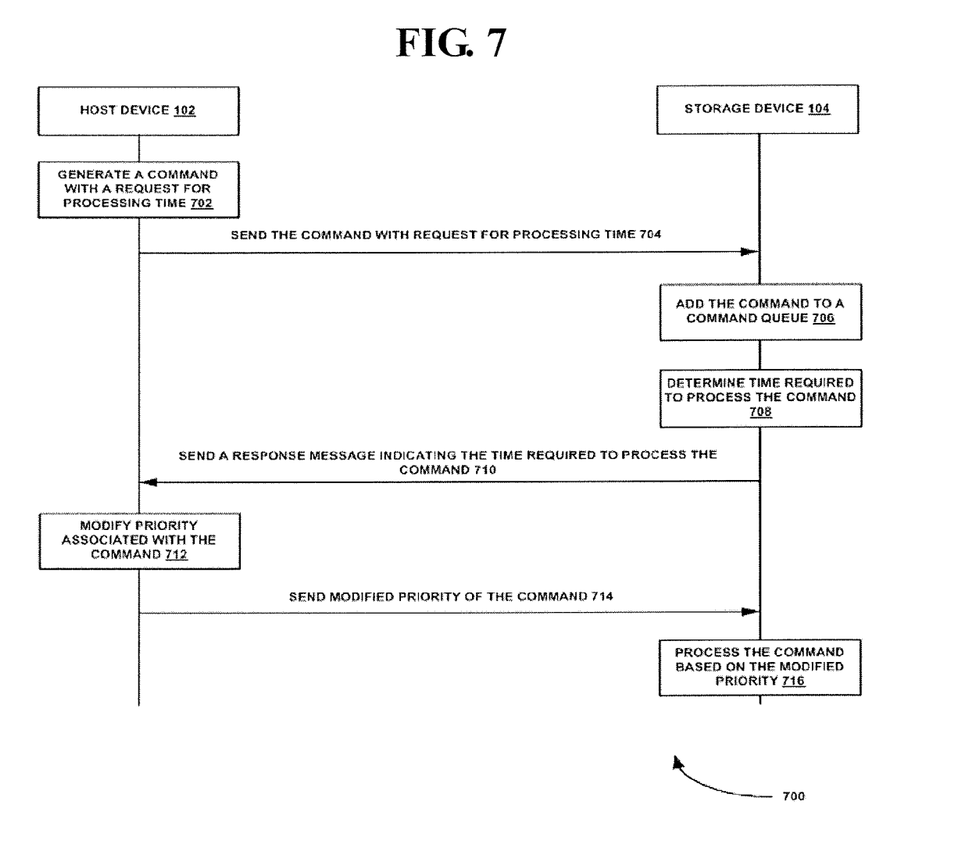
FIG. 7 is a flow diagram illustrating an exemplary method of processing storage processing storage commands, according to an exemplary embodiment of the present inventive concept.

FIG. 7 is a flow diagram 700 illustrating an exemplary method of processing storage commands, according to an exemplary embodiment. At operation 702, the host device 102 generates a command including a request for attending/processing time. At operation 704, the host device 102 sends the command including the request for attending/processing time to the storage device 104. At operation 706, the storage device 104 adds the received command to a command queue.

At operation 708, the storage device 104 determines the time required to attend/process the received command. For example, the time required for attending/processing the received command may be based on the number of commands to be processed in the command queue and the time required to process the commands queued ahead of the command queue. At operation 710, the storage device 104 sends a response message (e.g., a data-in packet, a response UPIU, etc.) indicating the time required to attend/process the command. At operation 712, the host device 102 modifies the priority associated with the command. For example, the host device 102 may change the priority from low to high based on when the requested data is required. At operation 714, the host device 102 sends a message having the modified priority of the command to the storage device 104. At operation 716, the storage device 104 adjusts the position of the command in the command queue (e.g., moves the command up or down in the command queue) according to the modified priority, and processes the command.

Figure 8:
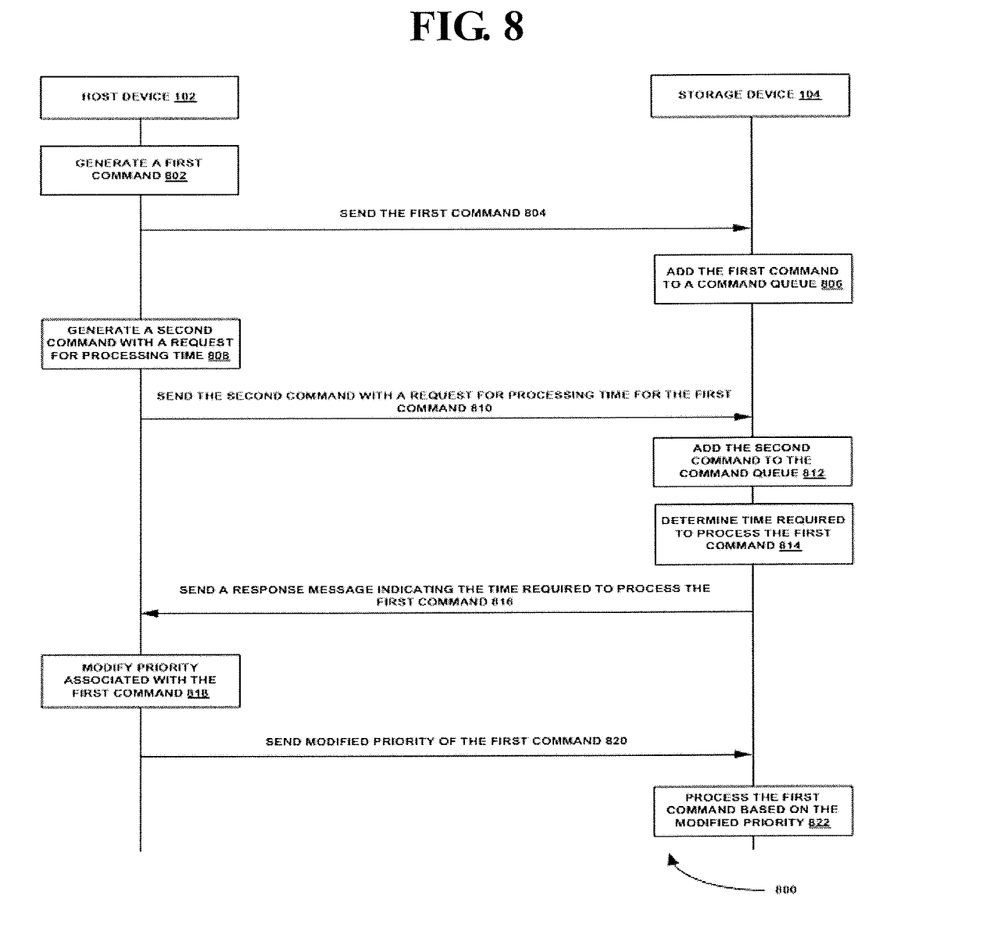
FIG. 8 is a flow diagram illustrating an exemplary method of processing storage commands, according to an exemplary embodiment of the present inventive concept.

FIG. 8 is a flow diagram 800 illustrating an exemplary method of processing storage commands, according to an exemplary embodiment. At operation 802, the host device 102 generates a first command. At operation 804, the host device 102 sends the first command to the storage device 104. At operation 806, the storage device 104 adds the first command to a command queue.

At operation 808, the host device 102 generates a second command with a request for the time required to process the first command. At operation 810, the host device 102 sends the second command with the request for the time required to process the first command to the storage device 104. At operation 812, the storage device 104 adds the second command to the command queue.

At operation 814, the storage device 104 determines the time required to process the first command. At operation 816, the storage device 104 sends a response message (e.g., a data-in packet, a response UPIU, etc.) indicating the time required to process the first command. At operation 818, the host device 102 modifies the priority associated with the first command. For example, the host device 102 may change the priority from low to high if the command is to be executed before other commands. At operation 820, the host device 102 sends a message having the modified priority of the first command to the storage device 102. At operation 822, the storage device 104 processes the first command according to the priority modified by the host device 102.

Alternatively, the host device 102 may send a task management command requesting processing time information for a particular command using, for example, a task tag. Accordingly, the storage device 104 may send the processing time information to the host device 102.

Figure 9:
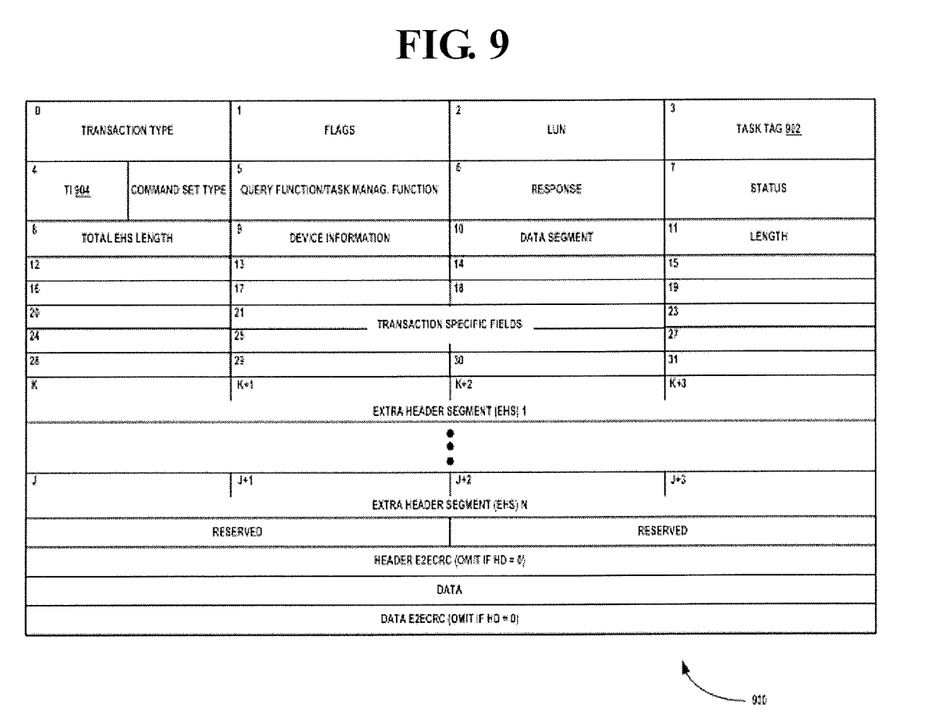
FIG. 9 is a schematic representation illustrating the format of a UPIU header including a request for the time required to process a UPIU, according to an exemplary embodiment of the present inventive concept.

FIG. 9 is a schematic representation illustrating the format 900 of a UPIU header including a request for the time required to process a UPIU, according to an exemplary embodiment. The UPIU header 900 includes, for example, a task tag field 902 and a time information (TI) field 904.

In FIG. 9, the task tag field 902 indicates a request for time required to process a UPIU. The TI field 904 indicates an action to be performed by the storage device 104. For example, in an exemplary scenario, the TI field 904 may be set to a value of '00xxb' if the storage device 104 need not send information regarding processing time. The TI field 904 may be set to a value of '01xxb' if the time required to process the instant UPIU is desired. The TI field may be set to a value of '01xxb' for the case illustrated in FIG. 7. The TI field 904 may be set to a value of '10xxb' if the time required to process the last UPIU is desired. Alternatively, an execution completion time field may be used instead of the task tag field 902. In this case, the task tag may not be required in the UPIU header 900.

For the case illustrated in FIG. 9, the TI field 904 is set to a value of '10xxb'. In an exemplary implementation, the first two bits of the TI field 904 are used to indicate the action to be performed by the storage device 104 when the processing time information is requested by the host device 102. As shown in FIG. 9, the remaining two bits of the TI field 904 may indicate the meaning of the time field when the UPIU is to be repeatedly processed.

Figure 10:
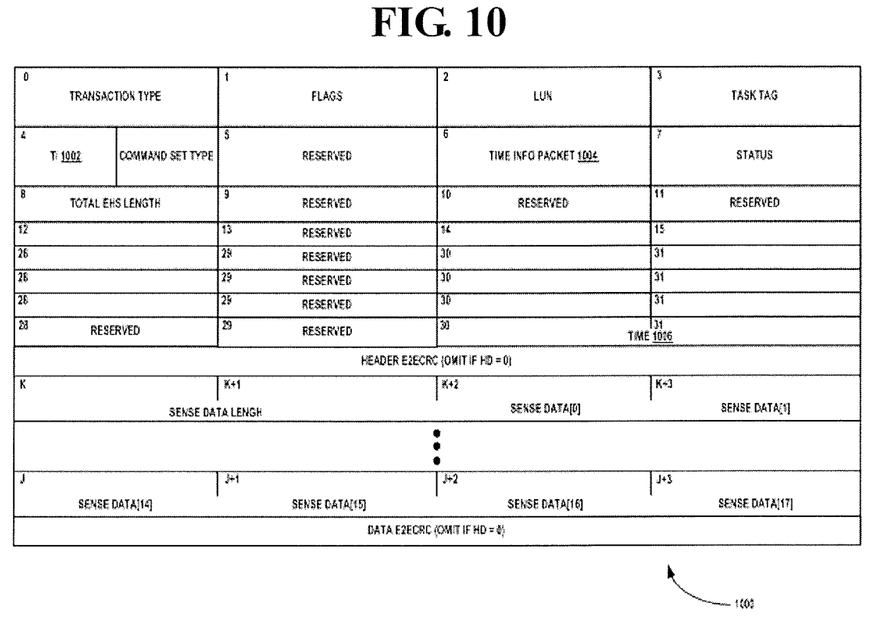
FIG. 10 is a schematic representation illustrating the format of a time info UPIU packet indicating the time required to process the UPIU, according to an exemplary embodiment of the present inventive concept.

In exemplary embodiments, the storage device 104 may send the time required to process a UPIU immediately in a time info UPIU packet upon receiving the UPIU. In these exemplary embodiments, the host device 102 may set a bit equal to 1 in the UPIU if an immediate response is desired. An exemplary time info UPIU packet is illustrated in FIG. 10. In exemplary embodiments, the storage device 104 may send the time required to process the UPIU to the host device 102 in a response message (e.g., a data-in response, a response UPIU, etc.) corresponding to the execution of a command. An exemplary response message corresponding to an executed command is illustrated in FIG. 11.

FIG. 10 is a schematic representation illustrating the format 1000 of a time info UPIU packet indicating the time required to process the UPIU 900, according to an exemplary embodiment. The time info UPIU packet 1000 includes, for example, a time information (TI) field 1002, a time info packet field 1004, and a time field 1006. The TI field 1002 indicates the same value as the TI field 902 of the UPIU. The time info packet field 1004 indicates that the UPIU packet corresponds to a time info UPIU packet. The time field 1006 indicates time required to process the UPIU 900.

Figure 11:
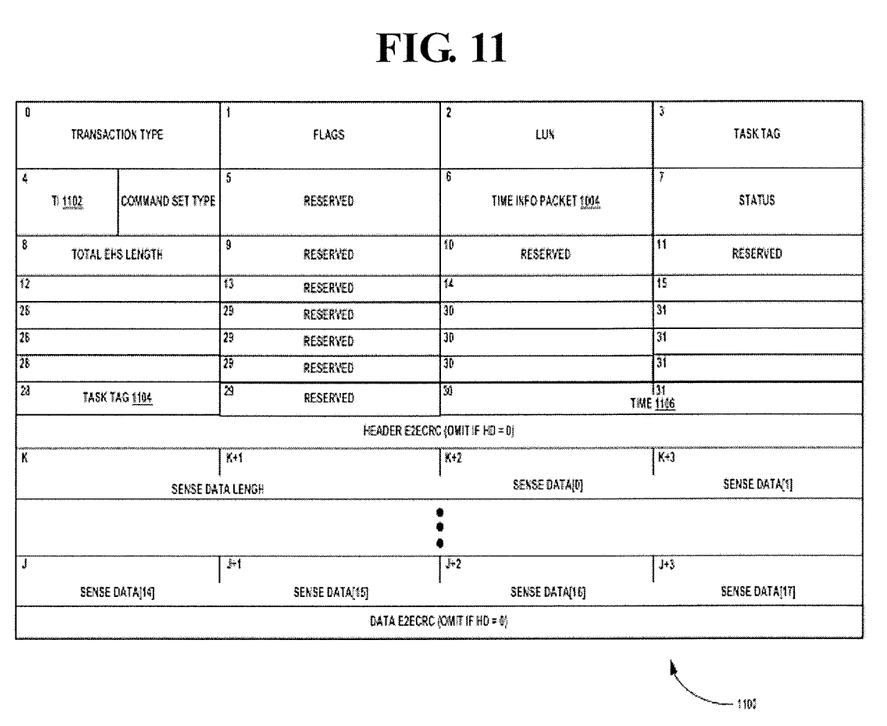
FIG. 11 is a schematic representation illustrating the format of a response message indicating the time required to process the UPIU, according to an exemplary embodiment of the present inventive concept.

FIG. 11 is a schematic representation illustrating the format 1100 of a response message indicating the time required to process the UPIU 900, according to an exemplary embodiment. The response message 1100 is an exemplary response message sent after processing other UPIUs received from the host device 102. The response message 1100 may include, for example, a time information (TI) field 1102, a task tag 1104, and a time field 1106. The TI field 1102 indicates the same value as the TI field 904 of the UPIU. The task tag field 1104 includes the task tag in the task tag field 902 of the UPIU 900 which requested the time information. The time field 1106 indicates time required to process the UPIU 900.

The various devices, modules, etc. described herein may be enabled and operated using hardware circuitry including, for example, complementary metal oxide semiconductor based logic circuitry, firmware, software and/or any combination of hardware, firmware, and/or software embodied in a machine readable medium. For example, the various electrical structures and methods may be embodied using transistors, logic gates, and electrical circuits, such as, for example, application specific integrated circuits.

While the present inventive concept has been particularly shown and described with reference to the exemplary embodiments thereof, it will be understood by those of ordinary skill in the art that various changes in form and detail may be made therein without departing from the spirit and scope of the present inventive concept as defined by the following claims.

What is claimed is:

1. A method of processing a storage command, comprising:

receiving the storage command from a host device at a storage device, wherein the storage command comprises rate information indicating a rate of repetition of the storage command;

processing the storage command, repeatedly, at a pre-determined time interval based on the rate information; and sending a response message to the host device, by the storage device, each time the storage command is processed.

2. The method of claim 1, further comprising:
updating a logical block address each time the storage command is processed.

3. The method of claim 1, further comprising:
terminating the repeated processing of the storage command upon processing the storage command a pre-determined number of times, wherein the storage command indicates the pre-determined number of times that the storage command is to be repeatedly processed.

4. The method of claim 1, further comprising:
terminating the repeated processing of the storage command upon receiving a termination request to terminate repetition of the storage command from the host device.

5. The method of claim 1, further comprising:
postponing the repeated processing of the storage command for a pre-determined time duration, wherein the storage command indicates the pre-determined time duration.

6. The method of claim 1, further comprising:
determining whether a data packet has been received from the host device prior to an expiration of a preset time period;
terminating the repeated processing of the storage command upon determining that the data packet has not been received prior to the expiration of the preset time period; and
transitioning to a new state upon terminating the repeated processing of the storage command.

7. The method of claim 1, further comprising:
determining a time required to process the storage command, wherein the response message sent to the host device indicates a time required to process the storage command.

8. A storage device, comprising:
a processor;
a memory; and
a command processing module configured to:
receive a storage command from a host device, wherein the storage command comprises rate information indicating a rate of repetition of the storage command;
process the storage command, repeatedly, at a pre-determined time interval based on the rate information; and
send a response message to the host device each time the storage command is processed.

9. The storage device of claim 8, wherein the command processing module is further configured to update a logical block address each time the storage command is processed.

10. The storage device of claim 8, wherein the command processing module is further configured to terminate the repeated processing of the storage command upon processing the storage command a pre-determined number of times, wherein the storage command indicates the pre-determined number of times that the storage command is to be repeatedly processed.

11. The storage device of claim 8, wherein the command processing module is further configured to terminate the repeated processing of the storage command upon receiving a termination request to terminate repetition of the storage command from the host device.

12. The storage device of claim 8, wherein the command processing module is further configured to postpone the repeated processing of the storage command for a pre-determined time duration, wherein the storage command indicates the pre-determined time duration.

13. The storage device of claim 8, wherein the command processing module is further configured to:
 determine whether a data packet has been received from the host device prior to an expiration of a preset time period;
 terminate the repeated processing of the storage command upon determining that the data packet has not been received prior to the expiration of the preset time period; and
 transition to a new state upon terminating the repeated processing of the storage command.

14. The storage device of claim 8, wherein the command processing module is further configured to:
 determine a time required to process the storage command, wherein the response message sent to the host device indicates a time required to process the storage command.

15. A system, comprising:
 a host device configured to generate a storage command comprising rate information indicating a rate of repetition of the storage command; and
 a storage device coupled to the host device and configured to:
  process the storage command, repeatedly, at a pre-determined time interval based on the rate information; and
  send a response message to the host device each time the storage command is processed.

16. The system of claim 15, wherein the storage device is further configured to terminate the repeated processing of the storage command upon processing the storage command a pre-determined number of times, wherein the storage command indicates the pre-determined number of times that the storage command is to be repeatedly processed.

17. The system of claim 15, wherein the host device is further configured to send a termination request to terminate the repeated processing of the storage command to the storage device.

18. The system of claim 17, wherein the storage device is further configured to terminate the repeated processing of the storage command in response to receiving the termination request.

19. The system of claim 15, wherein the storage device is further configured to postpone the repeated processing of the storage command for a pre-determined time duration, wherein the storage command indicates the pre-determined time duration.

20. The system of claim 15, wherein the storage device is further configured to:
 determine whether a data packet has been received from the host device prior to an expiration of a preset time period;
 terminate the repeated processing of the storage command upon determining that the data packet has not been received prior to the expiration of the preset time period; and
 transition to a new state upon terminating the repeated processing of the storage command.

\* \* \* \* \*